United States Patent
Zander et al.

(10) Patent No.: US 12,216,682 B2
(45) Date of Patent: Feb. 4, 2025

(54) METHOD AND DEVICE FOR VALIDATING DATA SETS IN A DATABASE

(71) Applicant: Robert Bosch GmbH, Stuttgart (DE)

(72) Inventors: Daniel Zander, Oberriexingen (DE); Ajay Kumar Nagaraj, Stuttgart (DE); Christopher Juerges, Leonberg (DE); David Huber, Gorxheimertal (DE); Joseph Trotta, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/362,640

(22) Filed: Jul. 31, 2023

(65) Prior Publication Data
US 2024/0045886 A1 Feb. 8, 2024

(30) Foreign Application Priority Data
Aug. 4, 2022 (DE) .................. 10 2022 208 099.8

(51) Int. Cl.
*G06F 16/27* (2019.01)

(52) U.S. Cl.
CPC .................. *G06F 16/278* (2019.01)

(58) Field of Classification Search
CPC .................................................... G06F 16/278
See application file for complete search history.

(56) References Cited

U.S. PATENT DOCUMENTS

| | | | | |
|---|---|---|---|---|
| 8,825,695 B2* | 9/2014 | Studer | ............ | G06F 16/258 |
| | | | | 707/769 |
| 10,592,508 B2* | 3/2020 | Srivastava | .......... | G06F 16/2358 |
| 10,754,764 B2* | 8/2020 | Lekivetz | ............ | G06N 3/084 |
| 11,586,611 B2* | 2/2023 | Srinivasan | ......... | G06F 16/9024 |
| 11,599,667 B1* | 3/2023 | Tutuianu | ............ | G06N 5/04 |
| 11,941,525 B2* | 3/2024 | Morin | ............ | G06N 3/045 |
| 11,947,622 B2* | 4/2024 | Xu | ............ | G06F 17/18 |
| 2004/0115013 A1* | 6/2004 | Goth | ............ | B65G 53/66 |
| | | | | 406/86 |
| 2007/0214133 A1* | 9/2007 | Liberty | ............ | G06F 16/9538 |
| | | | | 707/999.005 |
| 2011/0066602 A1* | 3/2011 | Studer | ............ | G06F 40/226 |
| | | | | 707/690 |
| 2014/0115013 A1* | 4/2014 | Anderson | ............ | G06F 16/215 |
| | | | | 707/812 |

(Continued)

FOREIGN PATENT DOCUMENTS

EP 2909747 * 8/2015

OTHER PUBLICATIONS

"Data validation", Wikipedia, https://en.wikipedia.org/w/index.php?title=Data%20validation&oldid=1099815571, available at least as early as Apr. 26, 2023 (5 pages).

(Continued)

*Primary Examiner* — Daniel A Kuddus
(74) *Attorney, Agent, or Firm* — Maginot, Moore & Beck LLP

(57) ABSTRACT

A method is for validating a data set in a distributed database system in which the data set is stored distributedly on computers of the distributed database system. The method includes sending a request to one of the computers by a central computer. The request has a command to check for a given criterion of a partial data set of the data set on the computer to which the request was sent.

7 Claims, 2 Drawing Sheets

(56) References Cited

U.S. PATENT DOCUMENTS

| | | | |
|---|---|---|---|
| 2015/0169650 A1* | 6/2015 | Gajic | G06F 16/285 707/737 |
| 2018/0075095 A1* | 3/2018 | Srivastava | G06F 16/213 |
| 2021/0232565 A1* | 7/2021 | Srinivasan | G06F 16/2365 |
| 2023/0004758 A1* | 1/2023 | Morin | G06F 18/2155 |
| 2023/0153462 A1* | 5/2023 | Tutuianu | G06F 16/2462 726/26 |

OTHER PUBLICATIONS

"Extract, transform, load", Wikipedia, https://en.wikipedia.org/w/index.php?title=Extract,%20transform,%20load&oldid=1096934118, available at least as early as Apr. 26, 2023 (9 pages).

* cited by examiner

METHOD AND DEVICE FOR VALIDATING DATA SETS IN A DATABASE

This application claims priority under 35 U.S.C. § 119 to patent application no. DE 10 2022 208 099.8, filed on Aug. 4, 2022 in Germany, the disclosure of which is incorporated herein by reference in its entirety.

The disclosure relates to a method for efficiently validating a data set in a distributed database system or file system (e.g., HDFS), a computer program, and a device configured to perform the method and a machine-readable storage medium.

BACKGROUND

Data is available in a variety of different formats, and processing it consumes large amounts of resources. It is therefore desirable to have the data in the correct format prior to initiating processing in order to work as resource-efficiently as possible (so-called fail fast, fail cheap). In order to process the data in a resource-efficient manner, erroneous data sets are validated before processing. In a validation step, for example, the data set is checked for the expected scheme (data type of the columns, nullability), the expected properties (numeric range, length of character strings, etc.) and the expected key structure (which combination of columns is to give a unique identifier).

Validation is also very useful before and after transformations and prior to persistence of results to ensure that no undesirable changes have been made.

There are several existing Python frameworks that cover this need, but they all suffer from one or more shortcomings. Pyspark data sets are saved in a column-based format (parquet), wherein the above-mentioned frameworks perform a row by row validation, which affects the performance for validation. The validation process should be a fast test and therefore kept as short as possible.

SUMMARY

The disclosure has the advantage that a large data set in a distributed database system can be validated in a particularly resource-efficient manner, in particular under a low utilization of a communication channel between the individual databases of the distributed database system. This also results in validation being able to be carried out up to 20 times faster.

In a first aspect, the disclosure relates to a particularly computer-implemented method for validating a data set in a distributed database system. With validating it can be understood to mean data validation, in particular a check for plausibility of data of the data set. That is to say, a validation can in particular be understood to mean that specific data, or the value of the data, are checked to determine whether they belong to a specific data type, are within a given range of values and/or a given amount of values, etc.

The distributed database system comprises a plurality of computers and a central computer, wherein the data set is stored distributedly on the computers. That is to say, the data record is distributed across several computers, in particular parts of the data set are stored on the computers. It is conceivable that a plurality of partial data sets is saved on one of the computers. The central computer can store how the data set is distributed over the plurality of computers, in particular, which partial data set is stored on which computer. It is conceivable that the central computer has access to further information that characterizes the data set, for example, which data types are stored in the data set, in particular which data type of the partial data record is available on the respective computer. Preferably, the further information comprises the range of values, etc., in which the entries of the respective partial data set may move.

The method begins with the central computer sending a request to one of the computers. The request has a command to check a partial data set of the data set on the computer to which the request was sent with respect to a given (validation) criterion. The criterion may be determined from the further information characterizing the data set.

Thereafter, execution of the command to be tested by the computer to which the request was sent may follow. Subsequently, a response by the computer may be sent to the central computer, comprising a result of the step of executing the command, in particular whether the partial data set satisfies the given criterion.

Due to the targeted request, the method has the advantage over known methods that only one request is necessary for the partial data set, whereas known methods check the entries of the data set individually. Usually the central computer checks the data individually, which is why the data set must then be effectively transferred. Thus, less data is exchanged within the distributed database system, resulting in an improved system throughput and thus an improved response time for validation.

It is proposed that the data set is in the form of a table having a plurality of columns, each associated with a data type, wherein the rows of the data set each have an entry, wherein the data set is stored in terms of columns distributed across the plurality of computers. Preferably, the command for checking is a command in which the entries are individually checked to see if they correspond to the data type associated with the corresponding column.

It is further proposed that the central computer send a request to a plurality, in particular to each, of the computers, wherein the computers execute the request and return a result of the request to the central computer via a message, and the central computer determines a validation of the data set, depending on the received messages.

It is further proposed that the central computer sends the requests simultaneously. This makes better use of the distributed structure of the database and generates even further performance gains for faster validation.

In further aspects, the disclosure relates to an apparatus and to a computer program, which are each configured to perform the aforementioned methods, and to a machine-readable storage medium on which said computer program is stored.

BRIEF DESCRIPTION OF THE DRAWINGS

Embodiments of the disclosure are explained in greater detail below with reference to the accompanying drawings. In the drawings.

DETAILED DESCRIPTION

Figure 1:
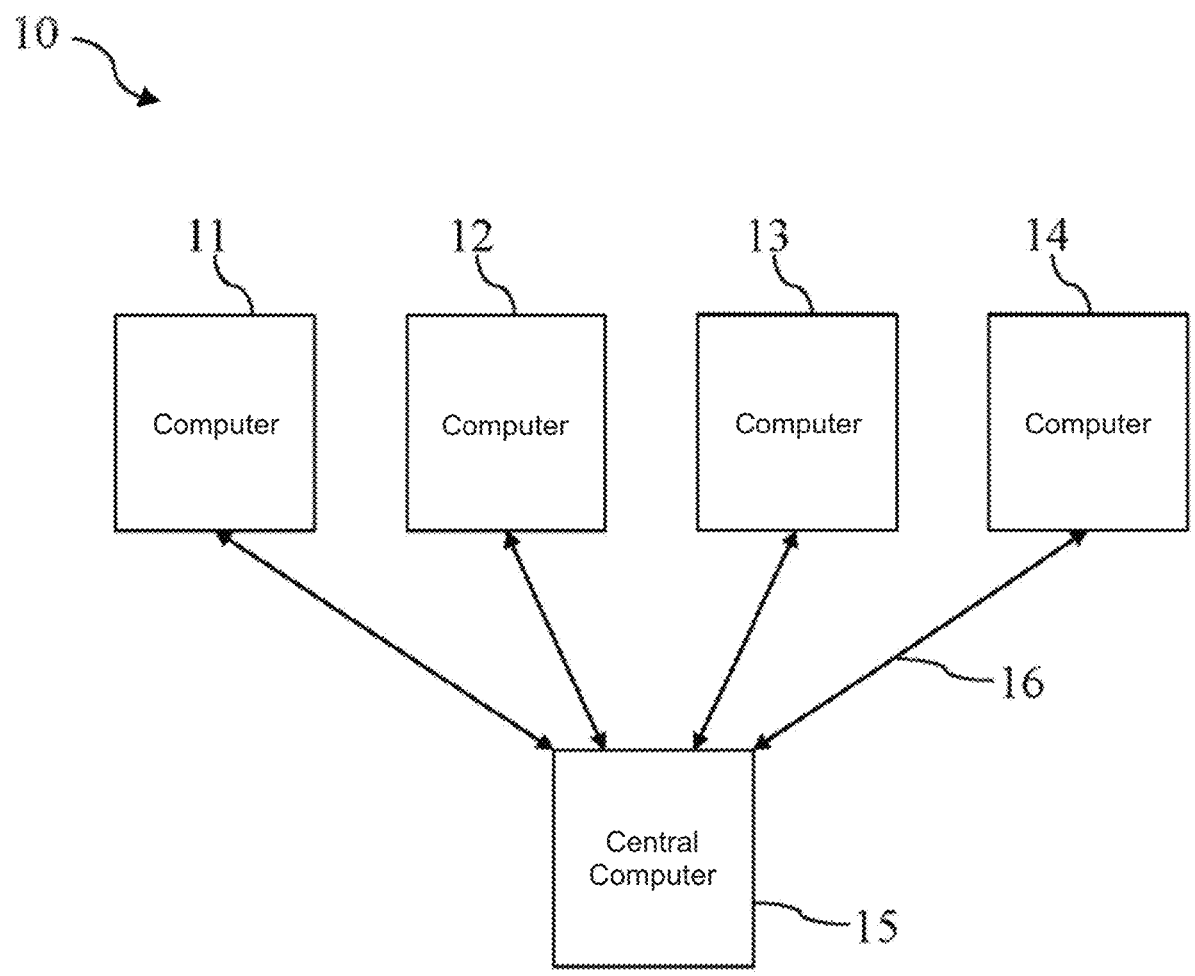
FIG. 1 schematically shows a distributed database.

FIG. 1 schematically shows a distributed database system (10). The distributed database system (10) comprises a plurality of computers (11-14) as well as a central computer (15), which manages the data of the distributed database system (10). The computers (11-14) and the central computer (15) are connected to each other via communication channels (16), for example via the internet or an intranet.

A large data set may be stored on the distributed database system (10). Here, the data set may be dissected and the individual dissected parts are stored on individual computers (11-14). If the computers are in geographically different locations, the data is stored at multiple physical locations.

In one embodiment, the data set may have x values, y values, z values, and optionally a timestamp. The data set can be given by a table in which the columns are assigned to one of the values and the rows each have the corresponding values for the columns. In a preferred embodiment of the data set, so-called distinct_keys may be defined, which combine a combination of columns into a unique identifier. In a further embodiment, the data set may also have nested entries, which may not contain an entry but may contain further data sets.

It is conceivable that the x values are stored on computer 11, the y values are stored on computer 12, the z values are stored on computer 13, and the timestamps are stored on computer 14.

To now validate the values of the data set, known methods would be performed according to the following pseudo-algorithm, which is performed on the central computer 15:

```
Loop i=Computer 11 ; i=Computer 14:
Loop j=0; j=10,000,000:
Request to Computer i:
Send to central computer, from column i, the j value
```

That is, a row by row validation of the data set is performed. For a data set with, for example, 10,000,000 data points per column, such a loop including the transfer of the values results in a high resource consumption of the database system.

In contrast, in a preferred embodiment, it is proposed that validation should now be done column by column. An exemplary pseudo-algorithm would be:

```
Loop i=Computer 11 ; i=Computer 14:
Request to Computer i:
Validate Column i
```

Based on this pseudo-algorithm, it can be seen that the loop over the individual values is omitted and furthermore, the validation takes place locally on the respective computer (11-14). In the above exemplary embodiment, for example, only one request is made to computer 11 to validate the x values and no individual transmission of the values to the central computer for validation.

Figure 2:
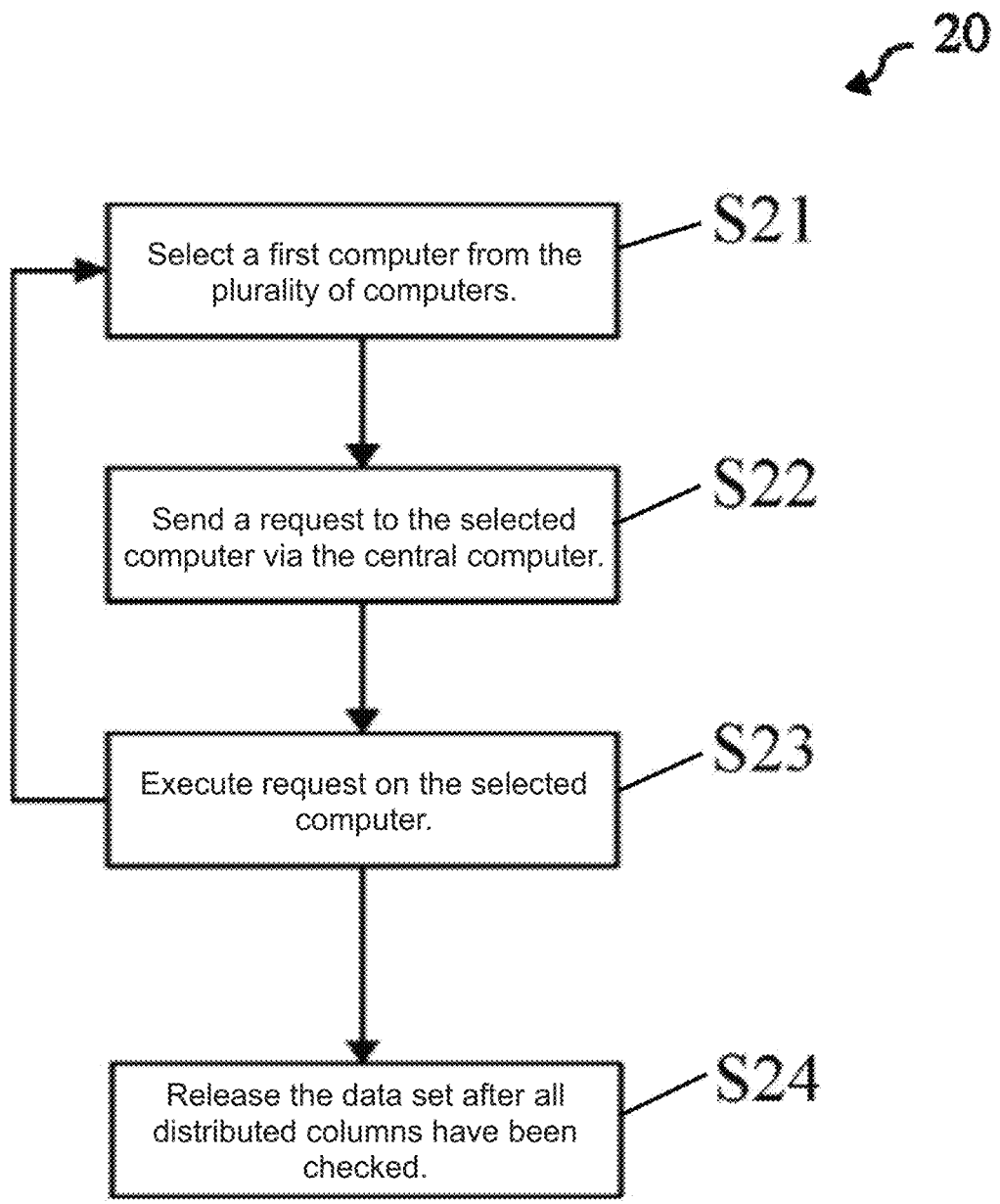
FIG. 2 schematically shows an exemplary embodiment of a flow chart of a method for validating large data sets.

FIG. 2 schematically shows a flow chart (20) of one embodiment for validating the data set, which is stored distributedly on the computers (11-14).

The method starts with step S21. In this step, a loop is started via the computers (11-14). That is to say, for the first loop pass, a first computer is selected from the plurality of computers (11-14).

In the subsequent step S22, a request is sent to the selected computer from step S21 via the central computer (15).

On the selected computer, the request is then executed in the following step S23. In particular, the column of the data set on the computer is validated with respect to a validation criterion from the request.

The selected computer can then send a message to the central computer (15) and confirm whether the validation was successful, i.e., the entries of the column have satisfied the criterion or not.

If the criterion is satisfied, then step S21 is performed again and another computer is selected and steps S22 and S23 are performed for that newly selected computer.

After all distributed columns have been checked on the computer by means of the loop via steps S21 to S23, the data set can be released in a subsequent, optional step S24, for example if the central computer has received the message from all computers that the columns meet the respective criteria.

What is claimed is:

1. A computer-implemented method for validating a data set in a distributed database system, the distributed database system comprising a plurality of computers and a central computer, the method comprising:
   storing the data set in the distributed database system, the data set including a table having a plurality of columns, each column of the plurality of columns being associated with a data type, each row of the data set having an entry, the data set being stored distributedly on the plurality of the computers with respect to the plurality of columns;
   sending, with the central computer, a request to the plurality of computers, the request including a command to check a respective partial data set of the data set stored on each respective computer of the plurality of computers;
   checking, with each respective computer of the plurality of computers, whether entries in an entire column of the respective partial data set satisfy a criterion;
   returning, with each respective computer of the plurality of computers, a respective message to the central computer indicating a result of the checking of the respective partial data set; and
   validating, with the central computer, the data set depending on the respective message received from each respective computer of the plurality of computers.

2. The computer-implemented method of claim 1, wherein the central computer simultaneously sends the request to the plurality of computers.

3. The computer-implemented method of claim 1, wherein the criterion is a data type of the respective partial data set or a nullability or property of the respective partial data set.

4. The computer-implemented method of claim 3, wherein the criterion includes a range of values of the entries, a maximum/minimum length of the entries, or a property of a uniqueness of columns.

5. The computer-implemented method of claim 1, wherein a device is configured to perform the method.

6. The computer-implemented method of claim 1, wherein a computer program includes instructions that, when the computer program is executed by a computer, cause the computer to carry out the method.

7. The computer-implemented method of claim 6, wherein the computer program is stored on a non-transitory machine-readable storage medium.

* * * * *